3,216,903
MOUNTING OF FUEL TUBE IN
REACTOR SHIELDING
Wilbur L. Bunch, Richland, Wash., assignor to the United
States of America as represented by the United States
Atomic Energy Commission
Filed May 26, 1964, Ser. No. 370,386
2 Claims. (Cl. 176—40)

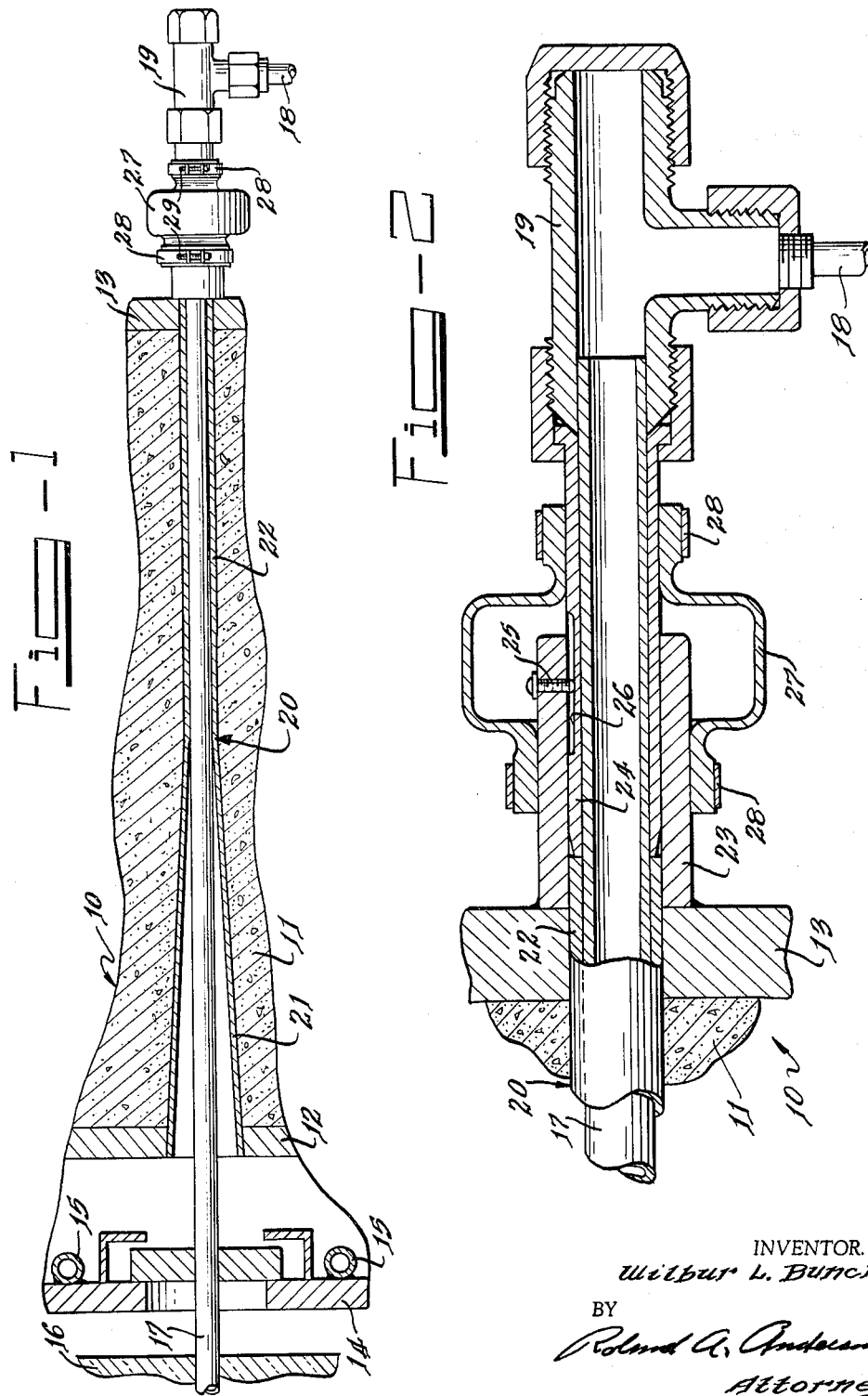

The invention described herein was made in the course of, or under, a contract with the U.S. Atomic Energy Commission.

This invention relates to an arrangement of a fuel tube in a shield for a nuclear reactor. More specifically, the invention relates to the mounting of a fuel tube in a reactor shield through which the tube passes on its way to the reactor core, which mounting allows for differential expansion of the core and shield while providing a radiation seal between the tube and shield.

A nuclear reactor is well known that has a large number of closely spaced parallel fuel tubes arranged in a square pattern or lattice in a graphite core and extending through an outer shield. At the tube holes in the shield provision must be made for relative movement of tubes and shield due to differential expansion of reactor core and shield. At the same time there should be no straight through openings in the tube holes permitting beams of radiation through the reactor shield. Moreover, excessive radiation leakage cannot be permitted to occur and so at the tube openings the voids and nonshielding portions of the reactor shield should be kept to a minimum.

In the drawings:

FIG. 1 is a sectional view taken through a reactor shield and showing the mounting of a fuel tube therein in accordance with the present invention; and FIG. 2 is an enlarged sectional view showing how the fuel tube is mounted at the outer side of the reactor shield.

As shown in FIG. 1, the reference character 10 designates a vertical radiation shield for a nuclear reactor that may be several feet in thickness and is formed of a mass of concrete 11 and inner and outer metal plates 12 and 13. To the left of the shield 10 is a thermal shield 14 carrying cooling tubes 15. To the left of the thermal shield 14 is a graphite mass 16, and to the left of the graphite mass are a thermal shield (not shown) and a radiation shield (not shown), similar to the shields 10 and 14, respectively. A fuel or process tube 17 passes through the radiation shield 10, the thermal shield 14, the graphite mass 16, and the unshown thermal and radiation shields therebeyond. The portion of the tube 17 in the graphite mass 16 contains jacketed bodies (not shown) of nuclear fuel, which together with other similar bodies in other process tubes (not shown) and the graphite mass, form the core of the nuclear reactor. The tube bodies are cooled by water that flows over them in the tube 17 and is supplied to the tube 17 by a line 18 through a T-fitting 19. The tube 17 extends through the shield 10 and the corresponding unnumbered shield at the other side of the reactor, so that used fuel elements can be removed from the tube in the reactor and new fuel elements can replace them. A reactor of this type is disclosed in FIGS. 37, 38, and 39 and columns 42, 43, 44 of Fermi et al. Patent 2,708,656, dated May 17, 1955.

The tube 17 passes through a sleeve 20 mounted in the shield 10 and comprising a conical portion 21 and a cylindrical portion 22. The conical portion 21 extends through the inner half of the shield 10 and loosely receives the tube 17. The cylindrical portion 22 of the sleeve 20 extends through the outer half of the shield 10 and fairly closely fits the tube 17 without being tight thereon. As shown in FIG. 2, the cylindrical section 22 of the sleeve 20 ends just beyond the outer plate 13 of shield 10 in a tubular section 23 fixed to the outer plate 13.

Just beyond the sleeve 20, the tube 17 has a sleeve 24 which is fixed therein by shrinking, brazing, or welding. The sleeve 24 is mounted in the tubular section 23. The end of the sleeve 24 adjacent the sleeve 20 forms an external shoulder that is capable of abutting the outer end of the sleeve 20 as shown in FIG. 2. The sleeve 24 can move out of abutment with the sleeve 20 if the tube 17 moves to the right because of expanding from heat in the reactor core. During such movement of sleeve 24, it is keyed against rotation by a screw 25 threaded through the tubular section 23 into a longitudinal groove 26 on the sleeve 24.

A bellows seal 27, which acts between the tubular section 23 and the sleeve 24, is clamped to these parts by straps 28, which as shown in FIG. 1 are tightened by screws 29 engaging flanged ends on the straps. Expansibility of the bellows seal 27 permits the sleeve 24 to move out of abutment with the tubular section 23.

The overlapping or facing relationship of the ends of the sleeves 20 and 24, whether abutting or not, prevents a beam of radiation out of the reactor between the tube 17 and the sleeve 20 in the shield 10. Thus as concerns a beam of radiation, it does not matter that the tube 17 may be slightly loose in the cylindrical portion 22 of sleeve 20.

When differential expansion of the reactor core and the shield 10 causes the tube 17 to be moved transversely of its axis, the conical portion 21 of the sleeve 20 permits such movement of the tube because of its loose fit on the tube. During such transverse movement of the tube 17, there is, of course, a bending of the tube because of its fairly close fit with the cylindrical portion 22 of the sleeve 20, but this bending can occur without danger to the tube 17, because it involves a relatively long region of the tube in the relatively long conical portion 21 of the sleeve 20. Yet the fairly close fit of the tube 17 in the cylindrical portion 22 of the sleeve 20 means that the voids in the shield 10 are kept to a minimum and its composition as a shield is satisfactory. This means that the spacing of the tubes in the square lattice in which they are arranged can be kept small.

It is understood that the invention is not to be limited by the details given herein but that it may be modified within the scope of the appended claims.

The embodiments of the invention in which an exclusive property or privilege is claimed are defined as follows:

1. In a nuclear reactor, a shield, a sleeve extending therethrough and having a conical section extending for about half the thickness of the shield at the inner side thereof and a cylindrical section extending for about half the thickness of the shield at the outer side thereof, and a fuel tube extending through the sleeve and beyond both ends thereof and having a fairly close fit with the cylindrical portion thereof, the fuel tube having an external shoulder abutting the outer end of the sleeve.

2. In a nuclear reactor, a shield, a sleeve extending therethrough and having a conical section extending for about half the thickness of the shield at the inner side thereof and a cylindrical section extending for about half the thickness of the shield at the outer side thereof, and a fuel tube extending through the sleeve and beyond both ends thereof and having a fairly close fit with the cylindrical portion thereof, the fuel tube having an external shoulder abutting the outer end of the sleeve, a sleeve applied to the exterior of the fuel tube and abutting the end of the sleeve in the shield at the outer side thereof, a tubular section fixed to the outer side of the shield and mounting the sleeve applied to the fuel tube, means keying the last mentioned tube to the tubular section, a bellows seal acting between the tubular section and a region of the last mentioned sleeve beyond the tubular section, a T-fitting connected with the fuel tube, and a line connected with the T-fitting to supply coolant to the fuel tube for the fuel therein.

References Cited by the Examiner
UNITED STATES PATENTS
2,975,115    3/61    Wigner et al. _____ 285—299 X REUBEN EPSTEIN, *Primary Examiner.*